United States Patent [19]

Ludwig et al.

[11] Patent Number: 4,865,925
[45] Date of Patent: Sep. 12, 1989

[54] GAS PERMEABLE ELECTRODE FOR ELECTROCHEMICAL SYSTEM

[75] Inventors: Frank A. Ludwig, Rancho Palos Verdes; Carl W. Townsend, Los Angeles, both of Calif.

[73] Assignee: Hughes Aircraft Company, Los Angeles, Calif.

[21] Appl. No.: 306,337

[22] Filed: Dec. 23, 1988

Related U.S. Application Data

[63] Continuation of Ser. No. 132,514, Dec. 14, 1987, abandoned.

[51] Int. Cl.⁴ .................... H01M 8/06; H01M 2/14
[52] U.S. Cl. .................................. 429/12; 429/20; 429/44
[58] Field of Search ............... 429/12, 20, 44, 19, 429/101, 105, 201, 247, 249

[56] References Cited

U.S. PATENT DOCUMENTS

| | | | |
|---|---|---|---|
| 3,231,426 | 1/1966 | Ludwig et al. | 429/11 X |
| 3,438,812 | 4/1969 | Cherney et al. | 429/59 |
| 3,764,387 | 10/1973 | Stark | 429/145 |
| 4,292,378 | 9/1981 | Krumpelt et al. | 429/15 |
| 4,654,104 | 3/1987 | McIntyre et al. | 156/276 |
| 4,654,279 | 3/1987 | Bauer et al. | 429/192 |
| 4,738,904 | 4/1988 | Ludwig et al. | 429/17 |

FOREIGN PATENT DOCUMENTS

| | | |
|---|---|---|
| 3239992 | 5/1984 | Fed. Rep. of Germany . |
| 3302635 | 8/1984 | Fed. Rep. of Germany . |
| 791075 | 2/1958 | United Kingdom . |
| 1020171 | 2/1966 | United Kingdom . |
| 2039133 | 7/1980 | United Kingdom . |

OTHER PUBLICATIONS

Penner et al., "Ion Transporting Composite Membranes, I. Nafion-Impregnated Gore-Tex," J. Electrochemical Soc., vol. 132, No. 2, 1985, pp. 514–515.
Penner et al., "Electronically Conductive Composite Polymer Membranes," J. Electrochem. Soc., vol. 133, No. 2, Feb. 1986, pp. 310–315.

*Primary Examiner*—Anthony Skapars
*Attorney, Agent, or Firm*—Mary E. Lachman; W. J. Streeter

[57] ABSTRACT

An electrode apparatus adapted for use in electrochemical systems having an anode compartment and a cathode compartment in which gas and ions are produced and consumed in the compartments during generation of electrical current. The electrode apparatus includes a membrane for separating the anode compartment from the cathode compartment wherein the membrane is permeable to both ions and gas. The cathode and anode for the assembly are provided on opposite sides of the membrane. During use of the membrane-electrode apparatus in electrochemical cells, the gas and ions generated at the cathode or anode migrate through the membrane to provide efficient transfer of gas and ions between the anode and cathode compartments.

28 Claims, 1 Drawing Sheet

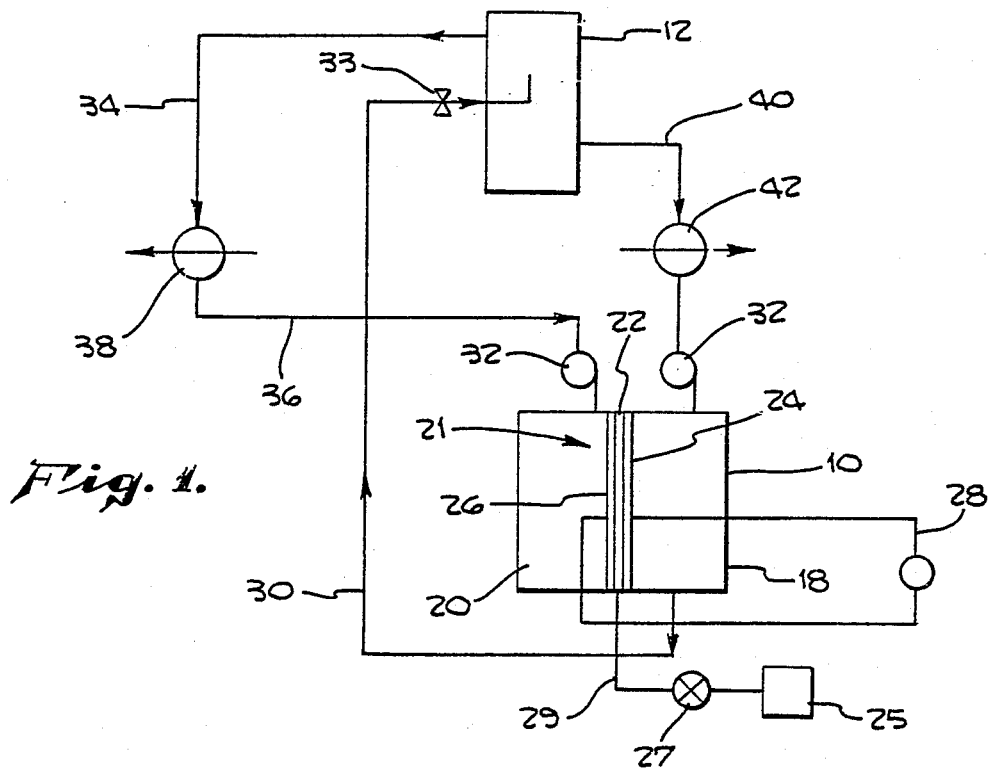
Fig. 1.
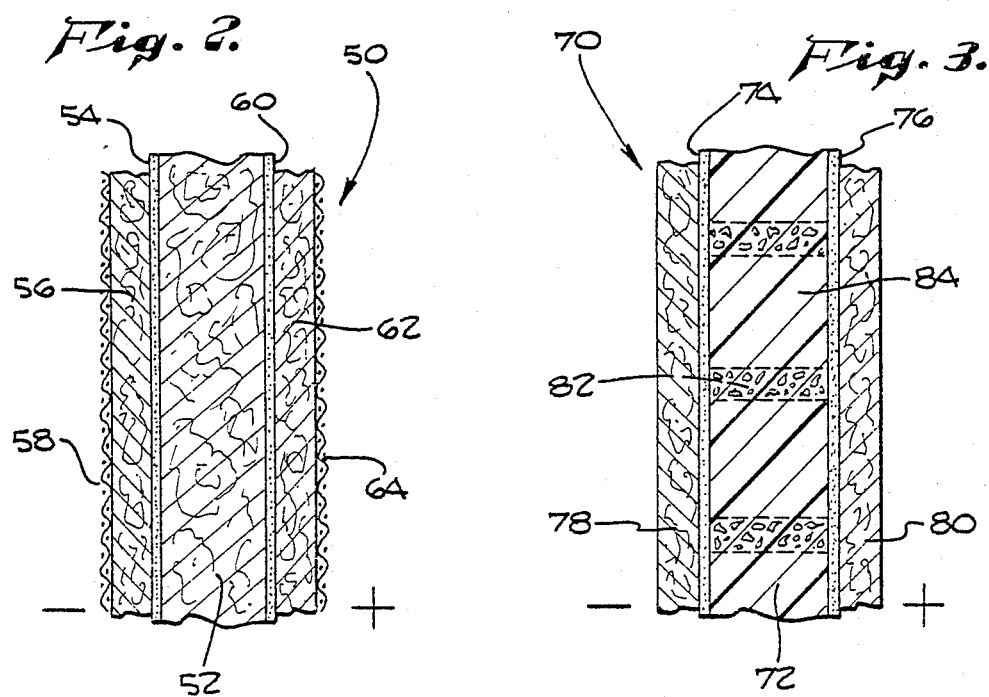
Fig. 2.
Fig. 3.

GAS PERMEABLE ELECTRODE FOR ELECTROCHEMICAL SYSTEM

This invention was made with United States Government support under Contract No. EG-77-C-01-4042 awarded by the Department of Energy. The U.S. Government has certain rights in this invention.

This application is a continuation of application Ser. No. 07/132,514 filed Dec. 14, 1987, now abandoned.

BACKGROUND OF THE INVENTION

1. Field of the Invention

The present invention relates generally to batteries and systems which convert chemical energy into electrical energy by use of a continuous concentration electrochemical cell. More specifically, the present invention relates to an improved gas-permeable electrode for use in such systems.

2. Description of the Background Art

U.S. Pat. No. 3,231,426, issued Jan. 25, 1966, discloses a continuous concentration cell in which a voltage is obtained and an electric current is generated between a cathode immersed in concentrated sulfuric acid and an anode immersed is dilute sulfuric acid. The reaction cycle which is set up between the electrodes is:

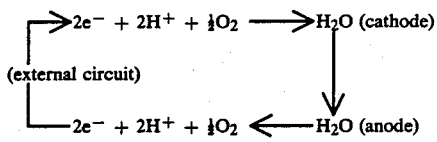

During operation of the cell, the concentrated sulfuric acid solution is diluted by water generated at the cathode, while the dilute sulfuric acid solution becomes more concentrated due to the generation of acid at the anode. The difference in acid concentration between the two solutions must be maintained in order to provide continuous generation of electrical energy. The system disclosed in U.S. Pat. No. 3,231,426 maintains the acid concentration gradient by heating the concentrated acid solution to distill off water generated at the cathode. The water which is continuously distilled from the concentrated acid solution is cycled to the dilute acid solution to continually provide dilution of the acid which is generated at the anode. Continuous concentration cells of the type described above utilize porous electronically non-conducting beds or barriers between the electrodes which typically are made from felted asbestos fibers, glass fibers or ceramic compositions such as alumina, zirconium oxide, ion exchange membranes, or porous organics, such as polypropylene or cellulose.

Another type of thermoelectrochemical system has been developed which functions as a low-temperature power converter in which the electrochemical cell reactants are thermally regenerated at a temperature below about 250° C.

This type of thermoelectrochemical system basically includes an electrochemical cell having a cathode compartment and an anode compartment. The two compartments have a common ion permeable separation wall which allows ions to pass between the two compartments but prevents the passage of gas. A hydrogen ion reacting cathode and a hydrogen ion reacting anode are located within their respective compartments with the cathode and anode being connectable externally from the system for generation of an electrical voltage and current between the electrodes.

A cathode fluid comprising a chosen Bronsted acid is typically located in the cathode compartment and in contact with the cathode. During one method of operation of the system, hydrogen gas is generated or collected at the cathode and the acid is consumed. The system further includes an anode fluid comprising a chosen Bronsted base which is located in the anode compartment and in contact with the anode. During one method of operation of the system, a cation of the base is generated and the base and hydrogen gas are consumed at the anode. At least one of the components, i.e., acid or base, comprises an organic material.

Because of the gas-impermeability of the ion-permeable separation wall, any hydrogen gas generated at the cathode during operation of the system is transferred externally to the anode compartment for consumption at the anode during generation of the electrical current. In addition, during operation of the system, the anions of the acid and/or the cations of the base migrate through the ion permeable separation wall into the anode or cathode compartment, respectively, where they combine with the cation of the base or the anion of the acid to form the corresponding salt. A feature of this system is that the salt is capable of being thermally decomposed at a temperature below about 250° C. to directly form the acid and base as two decomposition products. These products can be separated to regenerate the acid and base.

A thermal regenerator is provided in these systems for thermally converting the salt directly to the acid and base starting materials, at a temperature below about 250° C. Means for transferring the salt from the anode and/or cathode compartment to the thermal regenerator are also provided. Anode recycle means are provided for transferring the base formed in the thermal regenerator back to the anode compartment to replenish the base consumed during operation of the system. Cathode recycle means are also provided for transferring the acid formed in the thermal regenerator back to the cathode compartment to replenish the acid consumed during operation of the system.

The above-described systems are particularly useful because their relatively low operating temperatures (i.e. below 250° C.) allow them to be used in recovering waste heat in the form of electric power from internal combustion engines, industrial processes, and the like. They can also be used to convert heat from other sources such as solar energy, fossil or nuclear fuel, oil well heads or other geothermal heat sources.

An important consideration in thermoelectrochemical systems, as well as electrochemical systems, in general, is the overall efficiency of the system and the useful life. It is therefore desirable to continually search for improvements to such systems in which the performance, efficiency and life of the system are maximized.

SUMMARY OF THE INVENTION

In accordance with the present invention, a means is provided for improving the performance, reliability, and efficiency of electrochemical systems by reducing the complexity and internal electrical resistance of such systems.

The present invention involves the discovery that suitable separation walls between the cathode and anode compartments can be made which are permeable to both ions and gas. The provision of a gas permeable and ion permeable separation wall or membrane eliminates the need for externally transferring gases between the two compartments. This elimination of external gas transfer in accordance with the present invention reduces the internal resistance of the system and increases the efficiency of electrical and gas transfer between the anode and cathode compartments.

The present invention is based on an electrode apparatus which is adapted for use in electrochemical systems having anode and cathode compartments wherein the apparatus includes an anode and cathode between which is located a membrane having a cathode side and an anode side and wherein the membrane includes both ion-permeable and gas permeable regions to provide transfer of ions and gas between the cathode and anode.

The electrode apparatus of the present invention has application to any electrochemical system in which gas must be passed between the anode and cathode and may be used in place of existing membrane barriers or other barriers designed to provide selective passage of ions between anodes and cathodes. The invention is especially well suited for use in the continuous concentration systems or acid/base systems described above.

The electrode apparatus of the present invention is based upon the use of an ion-permeable and gas permeable membrane as the separator wall or barrier between the anode and cathode compartments of an electrochemical cell. It is preferred that the cathode and anode be placed as close to the membrane separator wall as possible in order to reduce the internal resistance of the cell due to ion migration through the electrolyte solutions and to reduce the distance that gas must move from its reaction site to or from the gas passage pores in the membrane. As a particular feature of the present invention, the anode and cathode are provided as porous coatings or thin layers contacting opposite sides of a gas- and ion-permeable membrane. This reduces the internal resistance of the cell because the ions and gas generated at the electrodes do not have to travel through any extensive distance in the liquid phase to reach the opposite electrode.

These and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a schematic representation of an exemplary thermoelectrochemical system utilizing the present invention.

FIG. 2 is a cross sectional representation of a preferred electrode apparatus in accordance with the present invention.

FIG. 3 is a cross sectional representation of an alternate preferred electrode apparatus in accordance with the present invention.

DETAILED DESCRIPTION OF THE INVENTION

An exemplary system in which the gas-permeable and ion permeable membrane of the present invention can be used is shown in FIG. 1. The system basically includes an electrochemical cell 10 and a thermal regenerator 12. However, it is to be understood that the present invention is not limited to a thermoelectrochemical system, but may be used in any electrochemical system as generally indicated at 10 in FIG. 1.

The electrochemical cell 10 includes a cathode compartment 18 and an anode compartment 20. The cathode and anode compartments 18 and 20 are separated by a preferred exemplary electrode apparatus as shown generally at 21. The electrode apparatus 21 includes a central membrane 22 which is permeable to both gas and ions. The membrane 22 is located between and in contact with an anode 26 and a cathode 24.

The requirements for membrane 22 are that it must be a permeable membrane or barrier which allows cation and/or anion exchange (i.e., a cation exchange membrane, an anion-exchange membrane or a microporous membrane for cation and anion exchange), while at the same time allowing gas transfer. The choice of the ion selectivity of the membrane depends on the particular electrochemical cell reaction of interest. In accordance with the present invention, gas and ion permeable regions coexist in the membrane. The permeability of these regions depends on the diameter of the "pores" in these regions and the degree of hydrophobicity of the walls of the pores. In addition, the cell liquids in the anode and cathode compartments must have sufficiently high surface tensions so that the hydrophobic material is not wetted by the liquids. Organic systems containing enough water or other high surface tension solvent to give surface tensions in excess of about 35 dynes per centimeter have been found to be suitable. Thus, in accordance with the present invention, high surface tension liquids are excluded from the small pores of the membrane. Consequently, liquid ionic solutions will not pass through the small pores, whereas gas is able to pass through the small pores. As the pore size is increased, the hydrophobicity of the walls exerts less effect, and the liquid ionic solutions can pass through the larger pores. While it is advantageous to have both hydrophobic and hydrophilic regions in close proximity in the membrane, a purely hydrophobic material can be used if it has a sufficient distribution or dispersion in the diameters of its pores. A large hydrophobic pore will not exclude liquid, whereas a small hydrophobic pore will exclude liquid.

Suitable membranes or barriers which provide the desired ion and gas permeability can be made in a number of different ways. For example, a mesh, cloth, paper, porous film or felt of gas permeable hydrophobic materials having openings or pores of varying size can be used to provide a barrier wherein gas is transported through the smaller diameter pores or passages in the fiber mesh, cloth, paper, felt or porous film and the ions are allowed to pass through the larger openings in the mesh, cloth, paper, felt, or porous film. Suitable materials for forming such a mesh, cloth, paper, porous film, or felt include non conducting carbon fiber, expanded teflon, or porous polypropylene. (Teflon is a polytetrafluoro ethylene manufactured by E.I. DuPont de Nemours of Wilmington, Del.). The term "porous teflon" as used herein is intended to include "expanded teflon," as is known in the art. The selected material should have a fine porosity, with sizes below 10 micrometer being preferred. For example, when using expanded teflon, the preferred pore size is within the range of about 1 to 3 micrometers. For Celgard 2400 and 2500 obtained from Celanese Corp. (Charlotte, N.C.), preferred pore sizes are about 0.02 and 0.4 micrometers, respectively. The actual fiber size and the size of the openings through the mesh can be varied depending upon the particular electrochemical cell, to provide desired rates of gas or ion transfer.

Alternatively, suitable membranes can be formed from a felt, mesh, cloth, paper or porous film of gas-permeable fibers or matrices, impregnated with an ion-exchange membrane material. Examples of the latter are specified below. Suitable matrices or fibers include electronically non conducting carbon fiber, and expanded teflon or porous polypropylene matrices. In such a membrane, the gas passes through the fiber or matrix while the ions pass through the ion exchange regions.

Suitable membranes can also be made by treating gas permeable membranes so as to provide regions within these otherwise ion impermeable membranes through which ions can be transported. For example, hydrophobic polypropylene, such as that marketed by Celanese Corp. (Charlotte, N.C.) as Celgard 2500, can be treated with drops of a solution of a cation or anion exchange membrane material which, when cured, provides ion permeable regions at selected spaced locations in the otherwise ion impermeable material. Solutions of such ion exchange membrane materials are available commercially, for example, from Solution Technology, Inc. of Mendenhall, Pa. An exemplary material is Nafion. Nafion is a trademark of E. I. DuPont de Nemours of Wilmington, Del., for a polymer of polytetrafluoroethylene with fluorinated ether side chains terminated with sulfonic acid groups. Another exemplary material is an alkali resistant copolymer of vinyl chloride and acrylonitrile with quaternary nitrogen groups, available from Ionics, Inc. of Watertown, Mass. The preferred procedures for preparing the gas- and ion-permeable membranes are discussed in detail below. In addition to polypropylene, other membrane materials can be used such as microporous polytetrafluoroethylene (PTFE).

Other suitable membranes for practicing the present invention can be made by treating hydrophobic membranes with hydrophilic surfactants so as to provide ion-permeable regions within these otherwise gas-permeable (ion impermeable) membranes. For example, hydrophobic polypropylene, such as that marketed by Celanese Corp. (Charlotte, N.C.) as Celgard 2400, can also be made hydrophilic by treatment with a surfactant, and this product is sold as Celgard 3400. By surfactant treatment at selected spaced locations in the otherwise ion-impermeable material, both liquid and gas can be transported through the modified membrane.

As yet another alternative, suitable membranes for practicing the present invention may be made by providing openings or holes in an ion exchange membrane such that gas but not ions can pass through the holes. The size and distribution of the holes can be determined for each particular electrochemical system used. Optionally, the membrane may be provided as a porous woven material, such as porous woven Nafion, obtained from E. I. DuPont of Wilmington, Del., and the gas passes through the openings in the woven material.

The membrane 22 is preferably as thin as possible without jeopardizing the structural integrity of the membrane. Membrane thicknesses on the order of about 1 to 10 mils (0.025 to 0.25 mm) have been found satisfactory and thicknesses of less than 5 mils (0.125 mm) are desirable.

The relative size of the areas of gas permeability and ion permeability in the membrane along with respective permeabilities can be varied to suit the particular electrochemical cell and the required ion and gas transport. The degree of either gas or ion transport must be sufficient to avoid large current-resistance (IR) drops through the membrane or significant concentration polarization in either the anode or cathode compartment.

Both the cathode 24 and the anode 26 are hydrogen electrodes (i.e., electrodes which react with hydrogen gas or hydrogen ions) and are porous to allow the passage of gas and ions through the electrode. One type of hydrogen electrode comprises a platinized porous carbon-teflon fuel cell electrode and is known in the art and commercially available. Another type of hydrogen electrode comprises a fine mesh screen of tantalum, stainless steel, or other non corrosive metal covered with platinum black. Still another type of hydrogen electrode is referred to as a solid polymer electrolyte (SPE) electrode and comprises a structure in which electrocatalyst is bonded directly to both sides of a solid polymer ionomer membrane to form the cathode and anode. In one method of construction of an SPE electrode, the catalyst in the form of a fine powder is mixed with teflon emulsion solution and sintered at about 345° C. The sintered teflon bonded catalyst is then bonded to the SPE membrane at elevated temperature and under pressure. Another SPE electrode construction comprises the sintering of a porous electrode using material made from carbon or graphite powder and PTFE mixed with a platinum catalyst or PTFE alone mixed with a platinum catalyst. This porous electrode material is preferably placed in direct contact with the membrane so that the membrane 22 is sandwiched between the two electrodes 24 and 26. This electrode material can also be bonded to both sides of the membrane with heat and pressure and/or glued to the membrane using ion exchange solutions, such as from Solution Technology, Inc., or prepared by known processes, such as described by Moore and Martin in *Analytical Chemistry*, Vol. 58, 1986, pages 2569–2570. In accordance with the present invention, the porosity of the electrode material must be sufficient to allow transport of ions and gas while still providing the desired cathode or anode functions. Since the electrode is depolarized both from the back (solution side) and from the front (membrane side), the electrode must be thin enough so this dual polarization can be kept to a minimum. A thickness of less than 20 mils (0.5 mm) is desirable.

The hydrogen gas necessary for operation of the hydrogen electrode is introduced into the electrode apparatus 21 from hydrogen reservoir 25 by way of control valve 27 and transfer line 29. Generally, once the membrane 22 is saturated with gas, no additional gas need be supplied except that which is needed to replace gas which escapes from the structure. This amount is quite small and can be made up by separating escaped gas from the liquid streams. In an optimized system this amount should be zero.

Referring again to the overall system of FIG. 1, the cathode compartment 18 includes a cathode fluid which is in contact with cathode 24. In a preferred thermoelectrochemical system, the cathode fluid is typically a Bronsted acid, i.e., a proton donor. The acid is chosen so that the anion of the acid combines with the cation of the base to form a salt which can be thermally decomposed at a temperature below about 250° C. to directly form the acid and base as two decomposition products which can be separated to regenerate the acid and base starting materials for the electrochemical cell reaction.

The cell reaction of the acid at the cathode 24 is shown in Equation (1) below, where hydrogen gas is generated or collected and acid is consumed at the cathode. The anion of the acid may have a valence other than that indicated in Equation (1).

$$X^- + H^+ + e^- \rightarrow \tfrac{1}{2}H_2 + X^- \quad (1)$$

where $X^-$ = anion of acid.

Acids which are used in this particular system include inorganic acids such as concentrated hydrochloric acid or phosphoric acid and organic acids such as methylsulfonic acid, trifluoromethylsulfonic acid, acetic acid, benzoic acid, and the borate ester formed by condensation of boric acid with ethylene glycol. A solvent may optionally be used with the acid.

An anode fluid is located in the anode compartment 20 for contact with anode 26. The anode fluid for a preferred thermoelectrochemical system is typically a Bronsted base, i.e., a proton acceptor. The base is chosen so that the cation of the base combines with the anion of the acid to form a salt which can be thermally decomposed at a temperature below about 250° C. to form two separable decomposition products and regenerate the acid and base, as previously discussed. The cell reaction of the base at a hydrogen anode is shown in Equation (2) below.

$$X^- + \tfrac{1}{2}H_2 + B \rightarrow BH^+ + e^- + X^- \quad (2)$$

where $X^-$ = anion of acid
B = base.

Thus, during the cell reaction, a cation of the base is generated and hydrogen is consumed at the anode. Bases which may be used in this particular system include inorganic bases such as ammonia or phosphine, and organic bases such as pyridine, aniline, triethanolamine, monoethanolamine, or diethylamine. A solvent may optionally be used with the base. Typically, either the acid or the base or both comprise an organic material.

As shown in FIG. 1, the electrodes 24 and 26 are connected to an external circuit schematically shown as 28 for generating an electrical current and voltage. The external circuit 28 can include electric motors or other systems for utilizing the electric energy generated by cell 10, or batteries or other suitable systems for storing the electric energy generated by cell 10.

In order to continually regenerate the acid and base consumed during operation of cell 10, the salt formed by the combination of the cation of the base and the anion of the acid is thermally decomposed. To accomplish this decomposition and regeneration, the electrolyte containing the salt is removed from the cell 10 and transferred to the thermal regenerator 12. If the salt is formed in the anode compartment 20, the anode solution is transferred to the thermal regenerator 12. If the salt is formed in the cathode compartment 18, the cathode solution is transferred to the thermal regenerator 12. If the salt is formed in both the anode and cathode compartments (20, 18), both the cathode and anode solutions are transferred to the thermal regenerator 12. For the sake of simplicity, FIG. 1 shows only one alternative, that in which the salt is formed in the cathode compartment 18, but the apparatus may be readily modified to accommodate the other alternatives mentioned.

In FIG. 1, the cathode solution is continually removed from the cell via line 30 and transferred to the thermal regenerator 12 utilizing pump 32 or other liquid transfer device. The cathode solution transferred in line 30 contains the salt in a solvent in the same concentration as present in the cathode compartment 18. In the thermal regenerator 12, the transferred cathode solution is heated to a temperature below about 250° C. to thermally decompose the salt $BH^+X^-$ to form the acid and base, as shown in Equation (3) below.

$$BH^+X^- \rightarrow B + H^+X^- \quad (3)$$

where B = base
$X^-$ = anion of acid.

The acid and base must be capable of being separated. If either the acid or base is volatile and the other is not, then the volatile component may be condensed and returned to the cathode compartment 18 if it is the acid or the anode compartment 20 if it is the base.

As shown in FIG. 1, the volatile base flows out of thermal regenerator 12 into line 34 where it is cooled and condensed in a condenser 38 to a temperature of about 0° to 80° C. The condenser 38 typically uses water or air as a heat transfer means. The cooled base is then conducted through line 36 into the anode compartment 20 to replenish the base therein. The liquid acid component remaining in the thermal regenerator 12 after heating is conducted out through line 40, and optionally through cooler 42, and is returned to the cathode compartment to replenish the acid therein. Solvent which was not volatilized by heating in the thermal regenerator 12 is carried along with the acid component.

The thermoelectrochemical system shown in FIG. 1 may be operated using a variety of acid base systems. Examples of such systems include, but are not limited to, those listed below.
a. Pyridine—methylsulfonic acid
b. Pyridine—hydrochloric acid
c. Pyridine—phosphoric acid
d. Pyridine—trifluoromethylsulfonic acid
e. Acetic acid—triethanolamine
f. Acetic acid—monoethanolamine
g. Acetic acid—diethylamine
h. Acetic acid—pyridine
i. Benzoic acid—ammonia
j. Aniline—hydrochloric acid
k. Ammonia—borate ester [condensation product of boric acid and ethylene glycol]
l. Lactic acid—diethylamine An exemplary electrode apparatus in accordance with the present invention is shown generally at 50 in FIG. 2. The apparatus 50 includes a central membrane 52 which can be made from electronically non-conductive carbon felt which is available from Fiber Materials, Inc. (Biddeford, Maine). The carbon felt which functions as membrane 52 is a very fine mesh felt material. It is believed that gas passes through or along the carbon fibers, to provide gas permeable regions in membrane 52. The openings between the fibers of the carbon felt are filled with a cation exchange material such as Nafion, for example, by adding the felt to a 5% solution of Nafion and boiling the solution to dryness. The Nafion regions in the felt function as the ion permeable regions when the membrane is saturated with solution during use as electrode apparatus 21 in an electrochemical cell such as 10 shown in FIG. 1. The composite carbon felt Nafion membrane may be visualized as a Nafion membrane having carbon fibers extending from one edge of the membrane to the other.

Anode means are provided on a first side of membrane 52. The anode means includes a layer of porous electrode material 54 comprising a carbon-teflon mixture impregnated with approximately 0.25 mg/cm$^2$ of platinum. Other porous hydrogen electrode materials can be utilized provided they have sufficient porosity to allow migration of gas and ions through the anode while providing desired hydrogen electrode characteristics. The porous layer 54 can be prepared, for example, by separating the catalyst layer from the hydrophobic backing of a fuel cell electrode manufactured by Energy Research Company (Danbury, Conn.). This separated catalyst is then pressed against the first side of membrane 52. Optionally, a porous electrode may be formed by depositing platinum black on a fine metal screen.

Current collector means for collecting current from the anode porous layer 54 are provided by, for example, a layer of electronically conductive graphite felt 56 and/or gold plated fifty mesh screen 58 formed of tantalum, stainless steel, or other non corrosive metal. The graphite felt layer 56 may be type VDG which is available from Union Carbide Company, New York, N.Y. Cathode means are provided on the second side of membrane 52. The cathode means includes the same layers as the anode means. These layers include porous electrode material layer 60, conductive carbon felt layer 62 and current collector screen 64. The electrode apparatus shown in FIG. 2 was tested as described in Example 1 herein.

A second exemplary electrode apparatus in accordance with the present invention is shown generally at 70 in FIG. 3. The apparatus 70 is the same as apparatus 50 in FIG. 2 in that it includes a central gas and ion-permeable membrane 72, porous anode layer 74, porous cathode layer 76 and current collectors 78 and 80. In this embodiment, the membrane 72 is constructed by placing small (1 mm) drops of five percent Nafion solution (obtained from Solution Technology Inc., Mendenhall, Pa.) onto selected regions of a piece of hydrophobic microporous polypropylene (Celgard 2500, from Celanese Corp., Charlotte, N.C.). The membrane is air dried and then cured at 120° C. for ten minutes. The Nafion solution produces regions permeable to cations as represented schematically at 82, with the remaining gas-permeable, ion impermeable regions of the hydrophobic microporous polypropylene being represented at 84. The porous electrode layers 74 and 76 can be made from the same material as in apparatus 50 of FIG. 2 and the current collectors 78 and 80 can be provided by graphite felt, for example. The electrode apparatus 70 was tested as described in Example 2 herein.

A third exemplary electrode apparatus in accordance with the present invention may be prepared by taking two pieces of porous (expanded) PTFE backed fuel cell electrodes from Energy Research Company and modifying these electrodes by coating the PTFE backing with five percent Nafion solution. The Nafion solution partially soaks into the PTFE to provide areas of ion permeability in the otherwise ion impermeable PTFE layer. The two electrodes are pressed together with the two PTFE surfaces in contact. The assembly is cured at 120° C. for one half hour to bond the two pieces together. The resulting structure comprises a sandwich structure including, from the outside in: (a) the two electrodes; (b) adjacent regions of porous teflon containing islands of Nafion; and (c) a central region containing islands of Nafion. Alternatively, a Nafion impregnated teflon composite may be simply pressed against fuel cell electrodes. The teflon is vacuum impregnated at 180° C. with the Nafion by dissolving Nafion in dimethyl sulfoxide (DMSO) and drawing this solution into the teflon. The vacuum treatment is continued until all of the DMSO evaporates. After the composite has cooled, hot DMSO (110° C.) is used to wipe excess Nafion from both surfaces of the membrane composite. Optionally, electrode means may be provided by vacuum impregnating a slurry of platinized activated carbon into the external pores (i.e. pores at or near the surface) of both sides of the membrane composite and bonding the electrodes to the membrane pores using Nafion solutions.

Collector means for each electrode are provided, for example, by tantalum screens which are embedded in the catalyst layers. A hydrogen manifold for introducing hydrogen gas into the membrane assembly is prepared by bonding a non-conductive tube to one edge of the assembly. RTV 3145 Sealant (from Dow Corning, Midland, Mich.) can be used to seal the remaining three edges of the assembly. This assembly and an alternative thereof were tested as described in Examples 3 and 4 herein.

A fourth exemplary electrode apparatus in accordance with the present invention may be prepared using a commercially available porous ion permeable membrane, such as porous Nafion, as the separation membrane and pressing commercially available fuel cell electrodes against the membrane. The gas passes through the pores in the membrane, while the ions pass through the membrane itself. This type of electrode apparatus was tested as described in Example 5.

EXAMPLE 1

This example illustrates the testing of the electrode apparatus shown in FIG. 2, using a composite carbon felt Nafion membrane. The electrode apparatus was constructed as previously described herein. In the first test described below, methylsulfonic acid was used as the cell fluid on both sides of the membrane. The purpose of this initial test was to prove that both gas and ions can be efficiently transported across the membrane. In the second test described below, other system fluids were used to provide improved efficiency in the passage of ions (or current) and gas.

The electrode apparatus shown in FIG. 2 was tested by immersion in a mixture of three moles water to one mole methyl sulfonic acid ($CH_3SO_3H$). A hypodermic needle was inserted into the membrane 52 to supply hydrogen thereto from a hydrogen gas cylinder. When current was applied to the assembly 50, hydrogen was produced at the cathode layer 60. This hydrogen is expected to diffuse through the membrane 52 and be consumed at the anode layer 54. Simultaneously, protons diffuse through membrane 52 from the anode 54 to the cathode 60. Polarization measurements were taken with a Model 363 potentiostat/galvanostat (obtained from Princeton Applied Research Company, Princeton, N.J.). Polarization tests are considered to be a good indication of the ability of an electrode apparatus to generate current when utilized in electrochemical cells of the type shown in FIG. 1. Since polarization represents the resistance or inefficiency of the system, a low polarization voltage is desirable. The results of the polarization tests conducted at room temperature were as follows:

| Current Density (ma/cm$^2$) | Polarization (mV) |
|---|---|
| 0.2 | 7 |
| 2.0 | 74 |
| 20.0 | 580 |

The results described above are interesting, but they do not prove that hydrogen from the cathode was passing to the anode, since hydrogen was fed to the electrode from an external source.

In a second test of the composite membrane electrode apparatus of FIG. 2, lactic acid (LA) and diethylamine (DEA) were used as the cell fluids. The test was conducted as described above except that the introduction of hydrogen through a hypodermic needle was omitted. The cathode compartment contained an acidic mixture consisting of 2.0:1.0:2.0 mole parts LA:DEA:H$_2$O, and the anode compartment contained a basic mixture consisting of 1.8:1.0:5.0 mole parts DEA:LA:H$_2$O. The electrode apparatus was bathed in pure H$_2$ at 4.2 psig prior to filling the anode and cathode compartments with the above liquid mixtures. It is this initially placed hydrogen which is counted upon to be trapped along the carbon fiber passages when the cell is filled with liquid acid and base. Tests were started at 74° C. The open circuit voltage was 0.29 volts. The short circuited current decreased from 1.5 ma/cm$^2$ to 0.2 ma/cm$^2$ after 60 minutes. At room temperature, currents of 0.2 ma/cm$^2$ could also be sustained.

It appears that these results were due to hydrogen dissolved in the cell fluids acting as a hydrogen source to the anode rather than due to the diffusion of hydrogen through the membrane from the cathode to the anode. In addition, the lack of temperature dependence in the experiments on the composite carbon Nafion membrane suggests that gas solubility and diffusion are rate controlling. From these results, it appears that the composite carbon Nafion membrane was not capable of passing hydrogen gas at the fluxes required to provide an operable system.

For purposes of comparison, the carbon felt described above was tested without the addition of Nafion. It was found that in a cell using this structure as the separation membrane, currents could be maintained only so long as external hydrogen was pumped in. Thus, this structure did not allow hydrogen gas to pass through the membrane.

EXAMPLE 2

This example illustrates the testing of the electrode apparatus shown in FIG. 3. The electrode apparatus was constructed as previously described herein.

The electrode apparatus shown in FIG. 3 was tested for polarization in the same manner as described in Example 1. The results were as follows:

| Current Density (ma/cm$^2$) | Polarization (mV) |
|---|---|
| 0.2 | 32 |
| 2.0 | 350 |
| 4.0 | 670 |

The apparatus 70 operated stably at 2.0 ma/cm$^2$ with the hydrogen supply shut off. By contrast, the electrode assembly 50 shown in FIG. 2 could maintain currents only briefly once the hydrogen supply was stopped, as previously discussed.

EXAMPLE 3

This example illustrates the testing of the third exemplary electrode apparatus of the present invention, comprising Nafion soaked PTFE layers bonded together. The electrode apparatus was constructed as generally described herein to provide the sandwich structure previously noted. This electrode apparatus was tested for polarization in the same manner as described in Example 1. The results were as follows:

| Current Density (ma/cm$^2$) | Polarization (mV) |
|---|---|
| 0.2 | 5 |
| 5.0 | 47 |
| 50.0 | 377 |

This assembly operated stably for 20 minutes with the hydrogen supply shut off.

EXAMPLE 4

This example illustrates testing of an alternative to the third exemplary electrode apparatus of the present invention comprising a Nafion-impregnated teflon composite.

This electrode was constructed as follows. Expanded teflon of 1.0 micrometer (0.0001 cm) nominal pore size was treated with Nafion to make a Nafion teflon composite which contained about 35% Nafion and 65% teflon. Permeability measurements showed that this composite passed H$_2$ gas at a rate of 0.1 cm$^3$/sec. cm$^2$ psi where psi refers to a differential pressure of one pound per square inch.

Electrodes were attached to the membrane composite as follows. Activated carbon, sold as Black Pearls 2000 by Cabot Company of Boston, Mass., was platinized and a slurry of the carbon was drawn into the external pores of the membrane composite by vacuum impregnation. This membrane composite had a thickness of approximately 15 mils (0.375 mm).

A 2 cm$^2$ electrode membrane composite combination was mounted in a glass cell and exposed to 1 atmosphere of hydrogen at room temperature. The anode compartment was then filled with a 15 weight percent ammonia, 85 weight percent water solution. The cathode compartment was filled with a solution made up from 0.80 mole fraction boric acid and 0.20 mole fraction ethylene glycol. This mixture forms an acid containing a borate-glycol ester anion by a condensation process involving elimination of water. The open circuit voltage of this cell was 0.225 volts. The short circuit current at room temperature was 2.0 ma/cm$^2$. The current-voltage plot was linear over the entire range.

In a separate test, electrodes were attached to the membrane composite by pressing against the membrane, fuel cell electrodes obtained from Prototech Company of Newton Highlands, Mass., and having 0.5 mg/cm$^2$ platinum loading. Using the same cell fluids as noted above, this system provided about 10 percent lower current at short circuit than the previous system using activated carbon. However, when a lactic acid diethylamine fluid system was substituted for the borate ammonia system, the short circuit current dropped to 0.55 ma/cm$^2$.

EXAMPLE 5

This example illustrates the testing of the fourth exemplary electrode apparatus of the present invention comprising a porous Nafion separation membrane.

A 21-mil (0.525 mm) thick porous Nafion membrane was obtained from Solution Technology Inc. of Mendenhall, Pennsylvania. Fuel cell electrodes obtained from Prototech Company of Newton Highlands, Mass. and identical with those used in Example 4, were pressed against the membrane. The assembly was mounted in test equipment that circulated temperature-controlled acid and base fluids past the cathode and anode respectively. The equipment also fed hydrogen or nitrogen gas to the edge of the anode. The working fluids comprised acidic and basic mixtures of lactic acid and diethylamine. The acidic mixture was made up by adding 103 ml of diethylamine and 36 ml of water to 204 ml of 75% by weight aqueous solution of lactic acid. The basic mixture was made up by adding 189 ml of diethylamine and 90 ml of water to 103 ml of 75% lactic acid.

At 60° C., the initial resistance of the 2.0 $cm^2$ cell was 20 to 30 ohms, which was 3 to 5 times the value measured under comparable conditions with the thin Nafion Teflon composite membrane used in Example 4. Early in the experiment, the short circuit current was 9 mA. Over a period of 18 hours, the short circuit current gradually decayed to 0.4 mA. At this stage, the current was the same whether nitrogen or hydrogen gas was fed to the edge of the anode. Coulombic data recorded during a 3-hour run with the anode and cathode compartments and the gas edge feed under a blanket of nitrogen showed unequivocally that hydrogen consumed by the anode must have travelled through the pores in the Nafion membrane.

This test demonstrates the viability of a cell based on porous Nafion as the separator material. The thickness of the available membrane, and the physical characteristics of the electrodes prevented achievement of optimum cell performance. Approaches for reaching optimum performance include fabrication of thinner porous Nafion membranes and the use of thinner electrodes, and better contact between the electrodes and the membranes. For example, an electrode apparatus could be formed as described in Example 4 by depositing catalyst particles within the surfaces of the membrane or as described earlier by thermal compression bonding and/or curing with Nafion solution used as a glue. By such bonding, thin catalyzed sheet electrodes can be bonded to the membrane or catalyzed particles within the external pore structure of the membrane can be bonded to the membrane structure. It is anticipated that with such optimization, cell performance comparable to those discussed in Examples 2-4 can be obtained.

These results presented in Examples 2-5 indicate the effectiveness of the electrode apparatus of the present invention for providing for the transfer of both gas and ions in an operating electrochemical cell. It is recognized that the current obtained was lower than is desired for an operating system. However, significant improvements in current may readily be obtained by: (a) increasing the temperature in the electrochemical cell; (b) optimizing the contact and/or bonding between the membrane composite and the electrodes; (c) making the electrodes thinner, for example, within the range of 1 to 4 mils (0.0025 to 0.01 cm); (d) making the separation membrane thinner; and/or (e) optimizing the electrode composition and structure to accommodate liquid flow. Thus, when used in such an optimized system it is anticipated that the electrode apparatus of the present invention can provide current at the levels required for practical application.

Although the present invention has been described in detail with regard to exemplary embodiments involving acid base type thermoelectrochemical cells, it should be understood that the invention is not limited to use only in these types of cells. Rather the present invention has wide application to any type of electrochemical cells where it is necessary to have combined transport of both gas and ions between the electrodes for proper cell operation. Those skilled in the art will recognize that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. An electrode apparatus adapted for use in an electrochemical system containing excess free electrolyte and having an anode compartment containing anode solution and a cathode compartment containing cathode solution of different composition than said anode solution, in which gas and ions are produced and consumed in said compartments during electrical current generation by said system, wherein said electrode apparatus comprises:

a membrane for separation said anode compartment from said cathode compartment, said membrane having a cathode side and an anode side and comprising ion-permeable regions to provide transfer of ions while limiting the flow of solution between the cathode and anode sides of the membrane to thereby maintain said anode solution separate from said cathode solution, and gas-permeable regions to provide transfer of gases between the cathode and anode sides of the membrane;

cathode means located in the cathode compartment on said cathode side of the membrane and in contact with said membrane for generating electric current; and anode means located in the anode compartment on said anode side of the membrane and in contact with said membrane for generation electric current wherein gas and ions generated at said membrane to provide transfer of said gas and ions between said anode and cathode compartments while limiting said flow of solution.

2. An electrode apparatus according to claim 1 wherein said anode means and said cathode means comprise hydrogen electrodes and said gas comprises hydrogen.

3. An electrode apparatus according to claim 1 wherein said ion-permeable regions are provided by ion-permeable materials selected from the group consisting of cation exchange materials or membranes, anion exchange materials or membranes and microporous hydrophilic membranes.

4. An electrode apparatus according to claim 1 wherein said gas permeable regions are provided by a hydrophobic microporous membrane material.

5. An electrode apparatus according to claim 4 wherein said gas permeable material comprises hydrophobic microporous polypropylene or microporous polytetrafluoroethylene.

6. An electrode apparatus according to claim 1 wherein said membrane comprises an ion permeable membrane having formed therein at selected locations gas-permeable regions.

7. An electrode apparatus according to claim 6 wherein said gas permeable regions comprise openings in said ion permeable membrane.

8. An electrode apparatus according to claim 1 wherein said membrane comprises a gas-permeable membrane having formed therein at selected locations ion-permeable regions.

9. An electrode apparatus according to claim 1 wherein said membrane comprises gas-conducting fibers in the form of a felt, said felt having ion-conducting material in the spaces between said fibers to allow passage of ions therethrough.

10. An electrode apparatus according to claim 9 wherein said gas-conducting fibers are selected from the group consisting of electronically non conducting carbon, porous polytetrafluoroethylene, and porous polypropylene.

11. An electrode apparatus according to claim 1 wherein said membrane comprises a hydrophobic material in the form of a felt, mesh, paper, cloth or porous film having openings of relatively small and relatively large sizes to allow passage of gas through said openings of small size and passage of ions through said openings of large size.

12. An electrode apparatus according to claim 1 wherein said cathode means comprises a layer of porous electrode material on the cathode side of said membrane.

13. An electrode apparatus according to claim 1 wherein said anode means comprises a layer of porous electrode material on the anode side of said membrane.

14. An electrode apparatus according to claim 12 wherein said anode means comprises a layer of porous electrode material on the anode side of said membrane.

15. An electrode apparatus according to claim 12 wherein said cathode means includes current collector means in contact with said porous electrode material for collecting electrical current generated thereby.

16. An electrode apparatus according to claim 13 wherein said anode means includes current collector means in contact with said porous electrode material for collecting electrical current generated thereby.

17. An electrode apparatus according to claim 14 wherein said porous electrode material comprises a carbon polytetrafluoroethylene mixture impregnated with platinum.

18. An electrode apparatus according to claim 14 wherein said porous electrode material comprises polytetrafluoroethylene impregnated with platinum.

19. An electrode apparatus according to claim 15 wherein said current collector means comprises:
an electrically conductive screen; and
a layer of electronically conductive felt located between and in contact with said conductive screen and said porous electrode material.

20. An electrode apparatus according to claim 16 wherein said current collector means comprises:
an electrically conductive screen; and
a layer of electronically conductive graphite felt located between and in contact with said conductive screen and said porous electrode material.

21. An electrode apparatus according to claim 1 wherein:
(a) said membrane comprises electronically non conductive carbon felt impregnated with a polymer of polytetrafluoroethylene with fluorinated ether side chains terminated with sulfonic acid groups; and
(b) said anode means and said cathode means each comprise:
(1) an electrode comprising a carbon-polytetrafluoroethylene mixture impregnated with platinum;
(2) a layer of electronically conductive graphite felt contacting said electrode; and
(3) a layer of gold plated mesh screen contacting said electronically conductive graphite felt.

22. An electrode apparatus according to claim 1 wherein:
(a) said membrane comprises hydrophobic microporous polypropylene including at selected locations regions of a polymer of polytetrafluoroethylene with fluorinated ether side chains terminated with sulfonic acid groups; and
(b) said anode means and said cathode means each comprise:
(1) an electrode comprising a carbon-polytetrafluoroethylene mixture impregnated with platinum; and
(2) a layer of electronically conductive graphite felt contacting said electrode.

23. An electrode apparatus according to claim 1 wherein:
(a) said membrane is formed from two layers of porous polytetrafluoroethylene each coated on a first side with a polymer of polytetrafluoroethylene with fluorinated ether side chains terminated with sulfonic acid groups, and bonded together on a second side opposite said first side;
(b) said anode means and said cathode means each comprise:
(1) an electrode comprising a carbon-polytetrafluoroethylene mixture impregnated with platinum; and
(2) a layer of electronically conductive graphite felt contacting said electrode.

24. An electrode apparatus according to claim 1 wherein said membrane is bonded to said anode means and said cathode means.

25. An electrode apparatus according to claim 1 wherein said membrane comprises porous polytetrafluoroethylene impregnated with a polymer of polytetrafluoro ethylene with fluorinated ether side chains terminated with sulfonic acid groups.

26. An electrode apparatus according to claim 25 wherein said anode means and said cathode means comprise a material selected from the group consisting of platinized activated carbon particles, platinum impregnated teflon, and platinum particles, located within and bonded to the external pores of said membrane.

27. An electrode apparatus according to claim 1 wherein said electrochemical system comprises lactic acid and diethylamine.

28. An electrode apparatus according to claim 1 wherein said electrochemical system comprises ammonia and borate ester.

* * * * *

UNITED STATES PATENT AND TRADEMARK OFFICE
CERTIFICATE OF CORRECTION

PATENT NO. : 4,865,925
DATED : September 12, 1989
INVENTOR(S) : Frank A. Ludwig and Carl W. Townsend It is certified that error appears in the above-identified patent and that said Letters Patent is hereby corrected as shown below:

Col. 14, line 31, delete "separation" and insert therefor --separating--;

line 47, delete "generation" and insert therefor --generating--; and line 48, after "at", insert --said cathode means and anode means migrate through--.

Col. 15, line 19, after "non", insert -- -(a hyphen)--.

Col. 16, line 3, after "non", insert -- -(a hyphen)--.

line 9, after "polytetra", insert -- -(a hyphen)--.

Signed and Sealed this

Twenty-fifth Day of December, 1990

*Attest:*

HARRY F. MANBECK, JR.

*Attesting Officer*     *Commissioner of Patents and Trademarks*